(12) United States Patent
Dal Negro

(10) Patent No.: US 9,360,597 B2
(45) Date of Patent: Jun. 7, 2016

(54) OPTICAL DEVICES WITH SPIRAL APERIODIC STRUCTURES FOR CIRCULARLY SYMMETRIC LIGHT SCATTERING

(71) Applicant: Trustees of Boston University, Boston, MA (US)

(72) Inventor: Luca Dal Negro, Cambridge, MA (US)

(73) Assignee: Trustees of Boston University, Boston, MA (US)

( * ) Notice: Subject to any disclaimer, the term of this patent is extended or adjusted under 35 U.S.C. 154(b) by 354 days.

(21) Appl. No.: 13/951,571

(22) Filed: Jul. 26, 2013

(65) Prior Publication Data
US 2014/0016181 A1     Jan. 16, 2014

Related U.S. Application Data

(63) Continuation of application No. PCT/US2012/022654, filed on Jan. 26, 2012.

(60) Provisional application No. 61/436,784, filed on Jan. 27, 2011.

(51) Int. Cl.
| | |
|---|---|
| *G02B 26/08* | (2006.01) |
| *G02F 1/29* | (2006.01) |
| *G02B 5/00* | (2006.01) |
| *G02B 27/42* | (2006.01) |
| *G01J 1/04* | (2006.01) |

(52) U.S. Cl.
CPC ............... *G02B 5/008* (2013.01); *G01J 1/0407* (2013.01); *G02B 27/42* (2013.01)

(58) Field of Classification Search
CPC .................................. G02B 26/08; G02F 1/29
USPC ................. 359/237–242, 265–272, 290–298
See application file for complete search history.

(56) References Cited

U.S. PATENT DOCUMENTS

| 2008/0171192 A1 | 7/2008 | Gadomsky |
| 2010/0126567 A1 | 5/2010 | Kaufman |

(Continued)

FOREIGN PATENT DOCUMENTS

JP        3911407 B2     5/2007

OTHER PUBLICATIONS

Albuquerque et al., Theory of elementary excitations in quasiperiodic structures, Physics Reports, vol. 376, Issues 4-5, Mar. 2003, pp. 225-337.*

(Continued)

*Primary Examiner* — Bumsuk Won
*Assistant Examiner* — Tamara Y Washington
(74) *Attorney, Agent, or Firm* — BainwoodHuang

(57) ABSTRACT

Optical devices including deterministic aperiodic patterning using spiral arrays exhibit circular symmetry in continuous Fourier space via polarization-insensitive planar diffraction. Far-field diffractive coupling in these structures leads to the formation of scattering resonances with circular symmetry and characteristic vortex behavior carrying orbital angular momentum. Plasmonic nanoparticle arrays with aperiodic spiral geometry can be used in fabrication of optical devices that benefit from polarization insensitive, enhanced light-matter coupling on planar surfaces, such as thin-film solar cells (enhanced light absorption and efficiency), photodetectors (enhanced light emission and efficiency), optical biosensors, and polarization devices.

20 Claims, 18 Drawing Sheets

(56) References Cited

U.S. PATENT DOCUMENTS

2010/0307553 A1    12/2010    Defries
2015/0029070 A1*    1/2015    Ohshima ................ H01Q 15/22
                                                                343/836

OTHER PUBLICATIONS

Mitchison, G. J., "Phyllotaxis and the Fibonacci Series," Science, published on Apr. 15, 1977, New Series, vol. 196, No. 4287, pp. 270-275.

Green, Martin A. "Third generation photovoltaics: solar cells for 2020 and beyond," Physica E, published in 2002, vol. 14, 65-70.

Naylor, Michael, "Golden, $\sqrt{2}$, and $\Pi$ Flowers: A Spiral Story," Mathematics Magazine, published in Jun. 2002, vol. 75, No. 3, pp. 163-172.

Parker et al. "Highly engineered mesoporous structures for optical processing" Philosophical Transactions of the Royal Society A, published on Nov. 29, 2005, vol. 364, pp. 189-199.

Pollard et al., "Low-contrast bandgaps of a planar parabolic spiral lattice," Optics Letters, published on Sep. 15, 2009, vol. 34, No. 18, pp. 2805-2807.

Lu et al, "Absorption Enhancement of Solar Concentrators via New Surface Photonic Designs," Materials Science Forum, published in 2010, vols. 636-637, pp. 855-859.

* cited by examiner

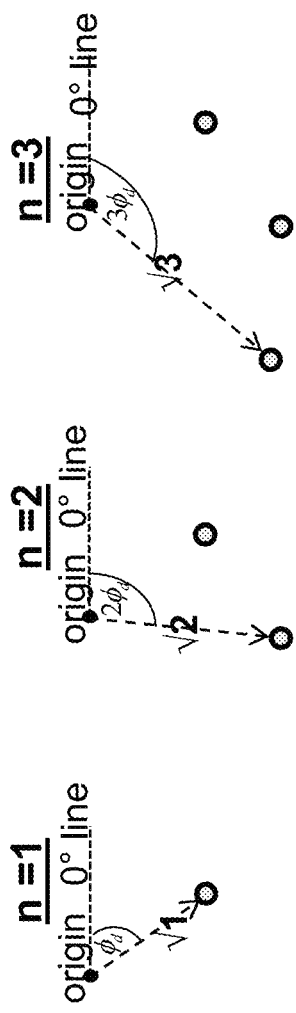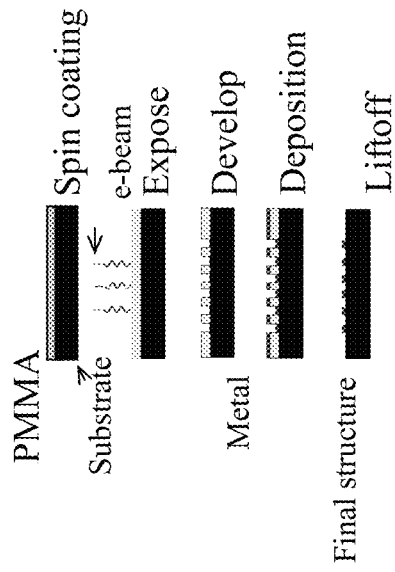

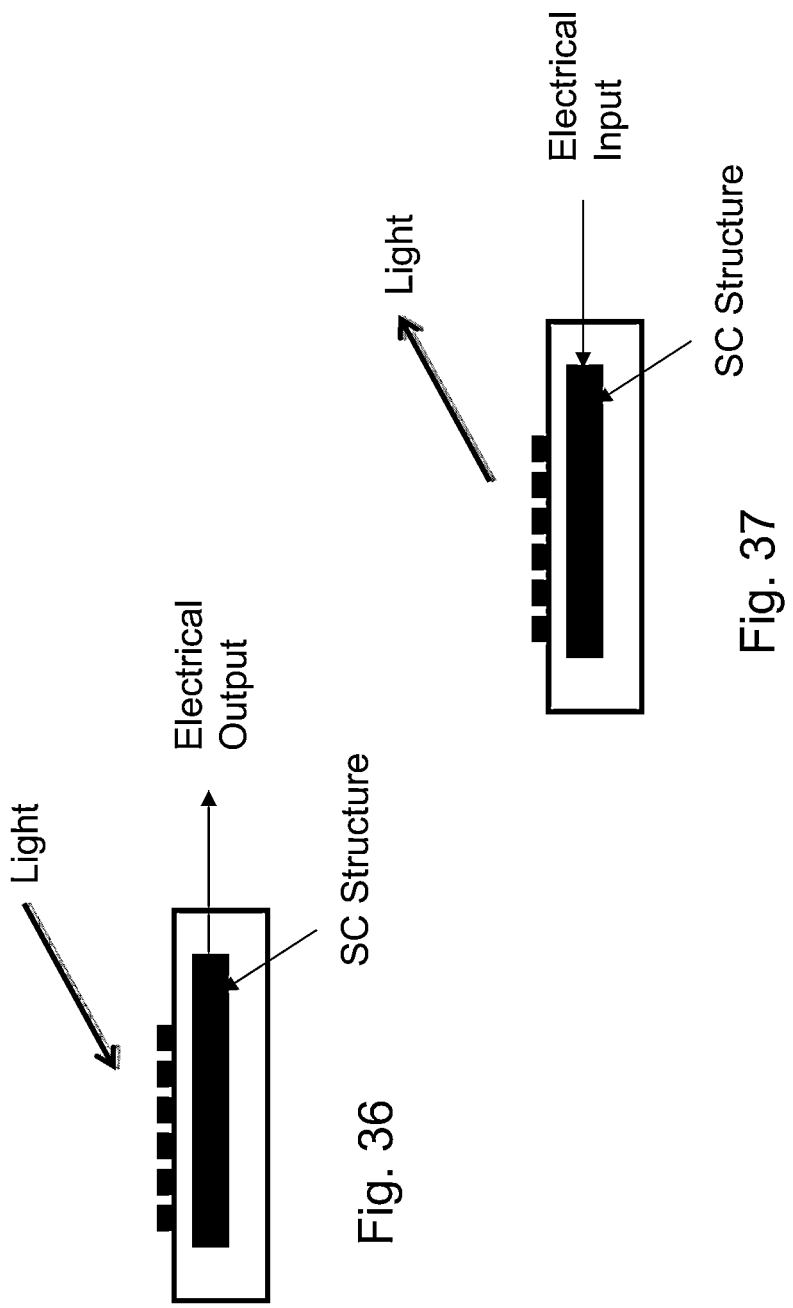

OPTICAL DEVICES WITH SPIRAL APERIODIC STRUCTURES FOR CIRCULARLY SYMMETRIC LIGHT SCATTERING

STATEMENT OF FEDERAL RIGHTS

The invention was made with Government support under Contract No. FA9550-10-1-0019 awarded by the Air Force Office of Scientific Research. The Government has certain rights in the invention.

BACKGROUND

The invention is related to the field of optical devices, and in particular to optical devices employing surface patterning for enhanced light-matter interaction.

Deterministic Aperiodic Nano Structures (DANS) enable the realization of complex scattering resonances and nanoscale localized optical fields. DANS can be realized as inhomogeneous metal-dielectric structures in which the refractive index fluctuates over multiple length scales comparable to or smaller than the wavelength of light. These structures are designed by mathematical rules, which interpolate in a tunable fashion between periodicity and randomness. In particular, their reciprocal Fourier space (i.e., Fraunhofer diffraction pattern) ranges from a discrete set of δ-like Bragg peaks (i.e., pure point spectrum), such as for periodic and quasiperiodic crystals, to a continuous spectrum (i.e., absence of Bragg peaks) with short-range correlations, as encountered in amorphous systems. Due to a far richer structural complexity compared to periodic, quasiperiodic, and disordered random media, the Fourier space of DANS can encode non-crystallographic point symmetries with rotational axes of arbitrary order. The optical properties of surface plasmon-polaritons in quasi-crystal arrays of sub-wavelength nanoholes fabricated in metallic thin films have been the subject of recent research efforts, leading to demonstration of phenomena such as resonantly enhanced optical transmission, sub-wavelength imaging and super focusing effects.

Quasicrystal structures generally possess well-defined scattering peaks (i.e., pure point spectra) which can be arranged to display discrete rotational symmetries (i.e., rotations of finite order n=5, 8, 10, 12), known as non-crystallographic point symmetries, because they are incompatible with the translational invariance of regular periodic crystals. On the other extreme, disordered and amorphous structures may be characterized by diffused Fourier spectra. Structures having infinite-order rotational or circular symmetry in reciprocal space (i.e., Fourier space) have been constructed by a simple procedure that iteratively decomposes a triangle into five congruent copies. The resulting aperiodic tiling, named the Pinwheel tiling, has triangular elements (i.e., tiles) which appear in infinitely many orientations. Its diffraction pattern approximates continuous circular symmetry only in the limit of an infinite-size structure.

SUMMARY

The present disclosure is directed to optical devices employing finite-size particle arrays that exhibit continuous circular symmetry in Fourier space. In particular, the particle arrays are realized by engineering aperiodic spiral order. Examples include three main types of Vogel's spirals, which lack both translational and orientational symmetry in real space while displaying continuous circular symmetry in reciprocal space. The Fourier space of Vogel's spirals consists of continuous scattering rings, similarly to the electron diffraction patterns observed in amorphous solids and liquids, or more generally in hyper-uniform point patterns. Different types of plasmonic Vogel's spirals employing gold (Au) nanoparticle arrays are fabricated by Electron Beam Lithography (EBL) on transparent quartz substrates. Polarization-insensitive circular diffraction and planar scattering are achieved in aperiodic spirals. Circular scattering may be engineered as a function of characteristic geometric parameters of the structures. The description focuses on the radiative (i.e., diffractive) coupling regime, which is responsible for the formation of distinctive structural resonances carrying orbital angular momentum in the scattered radiation from aperiodic spirals. Optical devices employing the disclosed nanostructures give rise to polarization-insensitive planar diffraction effects over large frequency bandwidths. Several specific device applications such as compact circular polarization devices, optical biosensors, and enhanced thin-film solar cells are described.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIGS. 7-9 are schematic diagrams illustrating how array elements are generated from a generating function;

FIG. 10 is a schematic diagram of a manufacturing process;

FIG. 36 is a schematic diagram of a light-detecting optical device;

FIG. 37 is a schematic diagram of a light-emitting optical device; and

DETAILED DESCRIPTION

The entire disclosure of PCT application PCT/US12/22654 is incorporated by reference herein.

Figure 1:
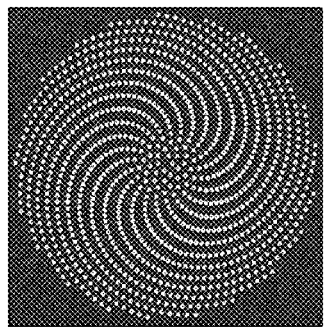
FIGS. 1-3 are images of surfaces having spiral nano-patterning.
Figure 2:
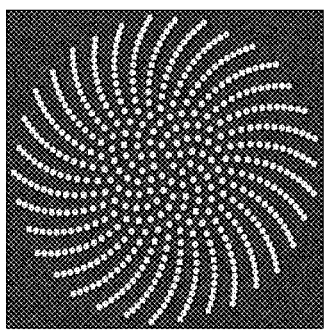
Figure 3:
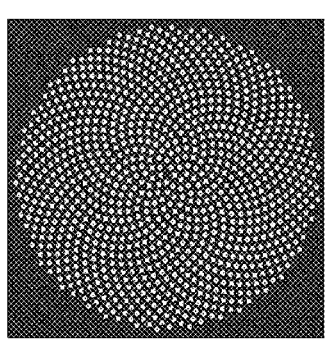

FIGS. 1-3 depict different types of patterned surfaces of an optical device, referred to herein as a g spiral or GA spiral (FIG. 1), $\alpha_2$ spiral (FIG. 2), and $\alpha_1$ spiral (FIG. 3). The spirals are formed as arrays of gold (Au) nanoparticles on a generally flat and non-textured substrate. The arrays each have 1000 particles of 200 nm diameter.

Figure 4:
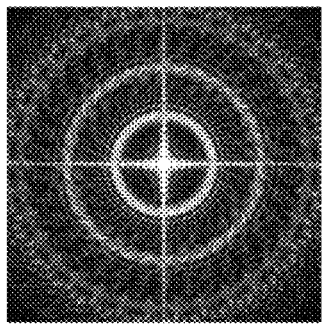
FIGS. 4-6 are images of frequency-space response of the patterns of FIGS. 1-3.
Figure 5:
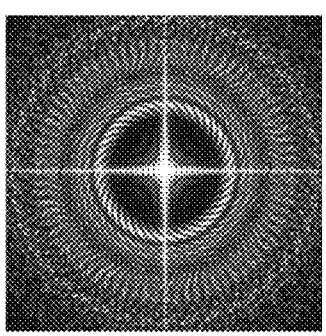
Figure 6:
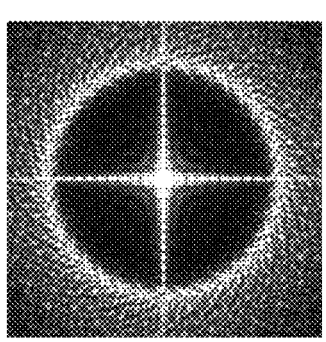

FIGS. 4-6 show calculated pseudo-Brillouin zones for respective spiral arrays of FIGS. 1-3, i.e., FIG. 4 shows the calculated zone for the g spiral of FIG. 1, FIG. 5 the zone for the $\alpha_2$ spiral of FIG. 2, and FIG. 6 the zone for the $\alpha_1$ spiral array of FIG. 3. The size of each zone is from $-1/\Delta$ to $+1/\Delta$, where $\Delta$ represents the average center to center particle separation. A more detailed description of the content and significance of these images given below.

Vogel's spirals can be considered a subset of the more general class of Fermat's spirals. They are obtained by a simple generation rule, expressed in polar coordinates r and $\theta$, first proposed by Vogel in order to approximate in two spatial dimensions the complex arrangements of florets in the sunflower head:

$$r = a\sqrt{n} \quad (1)$$

$$\theta = n\alpha \quad (2)$$

where n=0, 1, 2, ... is an integer, a is a constant scaling factor, and $\alpha$ is an irrational-valued constant divergence angle between successive position vectors (i.e., for each (n, n+1)). In one particular case, $\alpha \approx 137.508°$ is an irrational number known as the "golden angle" that can be expressed as $\alpha = 360/\phi^2$, where $\phi = (1+\sqrt{5})/2 \approx 1.618$ is the "golden number" (the approximate ratio of consecutive Fibonacci numbers). Rational approximations to the golden angle can be obtained by the formula $\alpha° = 360 \times (1+p/q)^{-1}$ where p and q<p are consecutive Fibonacci numbers. The resulting "sunflower spiral" is called the "golden spiral" or "g spiral".

The structure of a g spiral can be decomposed into an equal number of clockwise and counterclockwise spiral families originating from its center. The number of spirals in each family is found to be a Fibonacci number. Additionally, since the golden angle is an irrational number, the g spiral lacks both translational and rotational symmetry. Accordingly, its spatial Fourier spectrum does not exhibit well-defined Bragg peaks, as for standard photonic crystals and quasicrystals, but shows diffuse circular rings (as evident in FIGS. 4-6). Vogel's spirals with remarkably different structures can be obtained by choosing only slightly different values for the divergence angle $\alpha$, thus providing the opportunity to generate distinctively different degrees of aperiodic structural complexity using a single simple control value.

The aperiodic spirals of FIGS. 1-3 include the g spiral and two other aperiodic spirals obtained by the following choices of divergence angles: $\alpha_1 = 137.3°$ (i.e., $\alpha_1$ spiral, FIG. 2) and $\alpha_2 = 137.6°$ (i.e., $\alpha_2$ spiral, FIG. 3). The $\alpha_1$ and $\alpha_2$ spirals are called "nearly golden spirals", and their families of diverging arms, known as parastichies, are considerably fewer than for the golden spiral. When the divergence angle is slightly less than the golden angle, as for the $\alpha_1$ spiral, gaps appear in the center head of the spiral, and only the clockwise family of spiral arms can be seen. Gaps appear again if the divergence angle is slightly larger than the golden angle, as for the $\alpha_2$ spiral, but this time only the counterclockwise family of spiral arms can be seen. In the g spiral, the two spiral families are uniformly interlocked and the particles pack closely together without gaps.

FIGS. 7-9 illustrate how the generation function generates the points of a spiral. In this simplified example the divergence angle is shown as $\Phi_d$ and has a value of approximately 46°. FIG. 7 shows the first point at a distance of $1^{1/2}$, and FIGS. 8 and 9 show the addition of the second and third points at respective distances $2^{1/2}$ and $3^{1/2}$. This progression is simply continued for successive integer values of n as discussed above.

FIG. 10 illustrates a manner of fabricating a device having the spiral patterning described above. In this example, the nanoparticle spiral arrays are fabricated using Electron Beam Lithography (EBL) on quartz substrates. The fabrication process flow starts with a 180 nm-thick layer of PMMA 950 (PMMA being an acronym for Poly-Methyl MethAcrylate) spin coated on top of the substrate, followed by soft baking at 180° C. for 20 minutes. The nanopatterns are EBL written using a Zeiss SUPRA 40VP SEM equipped with Raith beam blanker and NPGS for nanopatterning. After developing the resist in MIBK (methylisobutyle ketone), a thin metal stack is deposited on the patterned surface by electron-beam evaporation. The stack may consist of a 2 nm Cr adhesion layer followed by a 23 nm Au layer for example. The remaining resist is then removed by a lift-off process using heated acetone. This process can yield metal particles that are cylindrical in shape with a circular diameter of 200 nm and a thickness or height of 30 nm. This process can be used to fabricate spirals having a range of minimum inter-particle separation (edge-to-edge) ranging between 90 nm and 680 nm.

Returning to the images of FIGS. 4-6, these illustrate diffraction properties of the plasmonic spirals by showing the structure of their corresponding Fourier spectra, or reciprocal space vectors, which can be obtained as the amplitude of the discrete Fourier transform (DFT) of the arrays. Because the spiral arrays are non-periodic, a Brillouin zone cannot be rigorously defined. As a result, when comparing the diffraction patterns of different types of aperiodic spirals, it is important to adopt an approach that guarantees homogeneous sampling of their aperiodic spectral features. This can be done by restricting their reciprocal space vectors to within the so-called "pseudo-Brillouin zones" which contain spatial frequencies in the compact interval $\pm 1/\Delta$, being $\Delta$ the average inter-particle separation.

FIGS. 4-6 show the calculated pseudo-Brillouin zones of the three types of nanofabricated spirals of FIGS. 1-3. Diffused spectra (i.e., absence of Bragg peaks) with rotational or circular symmetry (i.e., scattering rings) are clearly observed for all these spirals. While the g spiral features a broad and central scattering ring (FIG. 4), the more inhomogeneous structure of the $\alpha_2$ spiral (FIGS. 2 and 5) and the $\alpha_1$ spiral (FIGS. 3 and 6) is reflected by the presence of multiple concentric scattering rings embedded in a diffuse background of weaker intensity.

The circular symmetry of the reciprocal space of aperiodic spirals has direct implications on their diffractive properties. This can be appreciated within standard Fourier optics, neglecting near-field (quasi-static) interactions among neighboring particles. Under these conditions, well-satisfied by the choice of sample parameters, normal incidence radiation of wavelength λ is diffracted into the plane of the arrays when its longitudinal wavevector component vanishes, i.e., $k_z=0$. This requirement is equivalent to the well-known Rayleigh cut-off condition that determines the propagation of the first diffractive order of a periodic grating on its planar surface. The Rayleigh condition depends on wavelength λ and on the transverse spatial frequencies $v_x$ and $v_y$ of the of the diffracting element, according to:

$$k_z = 2\pi\sqrt{(1/\lambda)^2 - v_x^2 - v_y^2} = 0 \quad (3)$$

Equation (3) is satisfied on a circle of radius 1/λ in reciprocal space, and therefore structures with circularly-symmetric Fourier space satisfy the Rayleigh cut-off condition irrespective of the polarization of the incident field, strongly diffracting normal incident radiation into evanescent grating modes. The resonant condition expressed by Eqn. (3) may be said to induce "planar diffraction". In contrast to periodic crystals and quasicrystals with finite-order rotational symmetries, aperiodic spirals satisfy the condition for planar diffraction over a range of wavelengths uniquely determined by the number and the width of the scattering rings in their reciprocal space. The multi-band/broadband polarization-insensitive planar diffraction of aperiodic spirals is therefore a highly desirable property for the engineering of a variety of device applications that require increasing photonic-plasmonic coupling on planar optical chips.

Polarization-insensitive circular scattering from aperiodic spirals can be demonstrated experimentally by measuring Fraunhofer far-field intensity (i.e., the diffraction pattern) using different polarizations at normal incidence. For example, an incident light beam may be generated using a HeNe laser (λ=633 nm) source. The transmitted light can be collected with a 60× objective (NA=0.85), collimated and focused by lenses with focal lengths of 150 mm and 100 mm respectively onto a CCD camera. The polarization of the incident beam can be controlled by appropriate configurations of quarter and half-wave plates in the beam path. Measured Fraunhofer far-field intensity for unpolarized illumination is expected to agree very well with the calculated far-field patterns shown in FIGS. 4-6. As well, similar results are expected when polarized light is used, over a wide range of polarizations.

Figure 11:
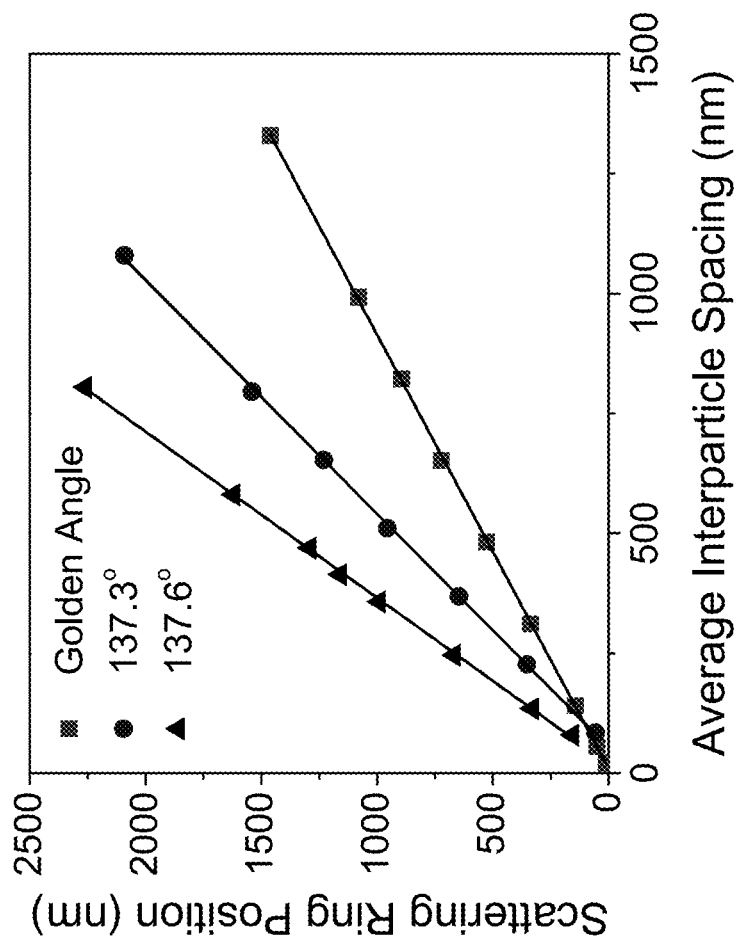
FIGS. 11 and 12 are plots of characteristics of patterns.
Figure 12:
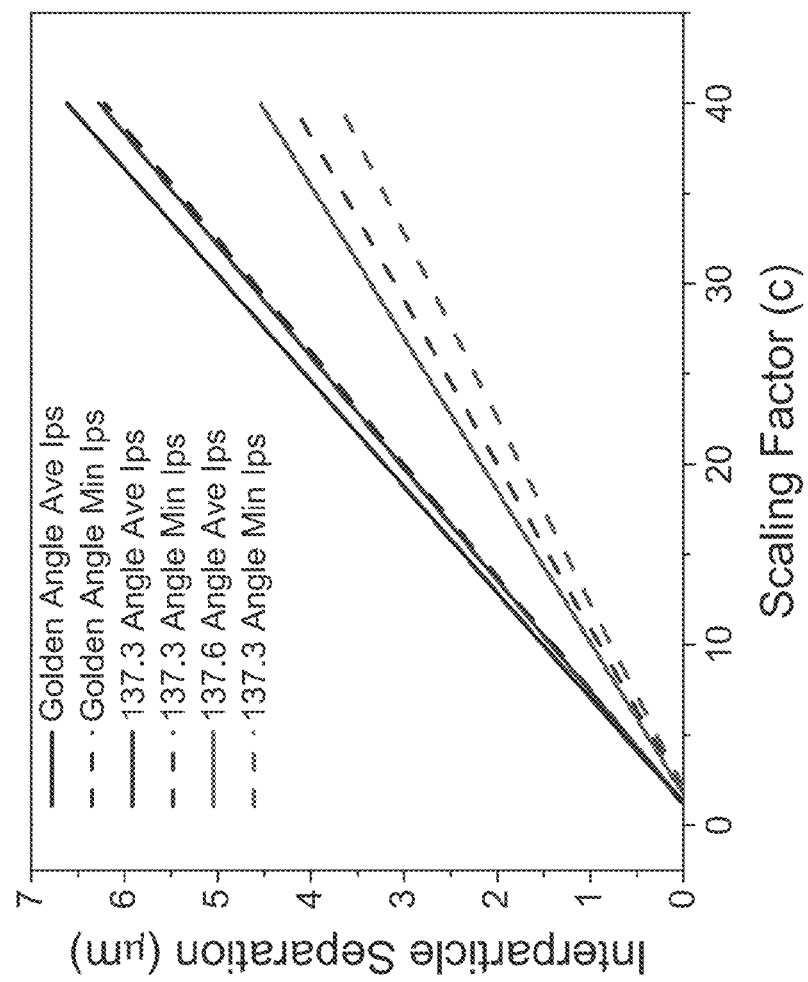

FIGS. 11 and 12 show relationships between certain parameters to illustrate that simple linear scaling laws determine the frequency of planar diffraction in circularly-symmetric aperiodic spirals. FIG. 11 shows the calculated spectral position (i.e., in units of inverse spatial frequency) of the center of the first (innermost) scattering ring in Fourier space, for the spirals of FIGS. 1-3, as a function of the average inter-particle separation. It can be seen that the scattering ring position for the g spiral scales nearly one to one with the average inter-particle separation (slope approximately equal to 1), while for the $\alpha_1$ and $\alpha_2$ spirals the scattering ring positions scale more rapidly with the inter-particle separations (respective slopes of approximately 2.05 and 2.89). FIG. 12 shows the simple linear relations between the average and minimum inter-particle separations (IPS) in the spirals with the corresponding scaling factors. The relations shown in these figures demonstrate the ability to engineer planar diffraction effects in circularly-symmetric aperiodic spirals.

FIGS. 13-17 illustrate an aspect of the disclosed spiral patterning technique referred to as "structural modulation of aperiodic spirals". Using the approach of varying the divergence angle, which is equivalent to a one-parameter structural phase transition, it is possible to controllably tune the spiral two-particle correlation function between one of a random system (i.e., a constant) and one of an amorphous (liquid) structure, which has many oscillations corresponding to local coordination shells. Moreover, Delaunay triangulation analysis can be used to calculate the spatial map of the distributions of nearest neighbor distances in the array. These distances are directly associated to the structure of local spatial frequencies present in the array, and are organized in circular bands of differing local inter-particle distances that can act as a "radial heterostructure" or "circular Bragg gratings" to trap and "twist" optical waves scattered by the aperiodic surfaces. This structural analysis immediately suggests ways to conveniently control orbital angular momentum (OAM) of light by scattering with aperiodic plasmonic or dielectric aperiodic spirals. More about OAM is described below.

Figure 13:
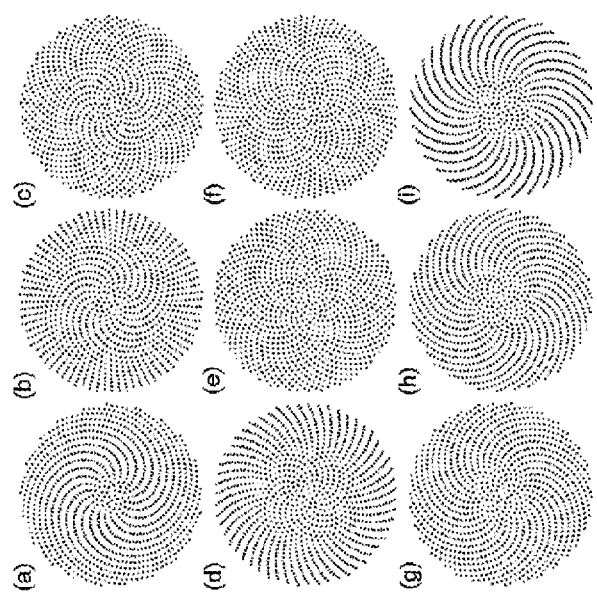
FIG. 13 (parts (a) through (i)) is a set of images of spiral nano-patterns.

FIG. 13 shows a number of Vogel spirals that all employ the same basic generating function, differing only by one single parameter, the divergence angle. The Vogel spiral arrays consist of 1000 particles, and they are created with different divergence angles as follows:

| Figure portion | Label | Divergence Angle |
|---|---|---|
| (a) | $\alpha_1$ | 137.300000 |
| (b) | $\alpha_2$ | 137.369255 |
| (c) | $\alpha_3$ | 137.403882 |
| (d) | $\alpha_4$ | 137.473137 |
| (e) | GA | 137.507764 |
| (f) | $\beta_1$ | 137.523137 |
| (g) | $\beta_2$ | 137.553882 |
| (h) | $\beta_3$ | 137.569255 |
| (i) | $\beta_4$ | 137.600000 |

Figure 14:
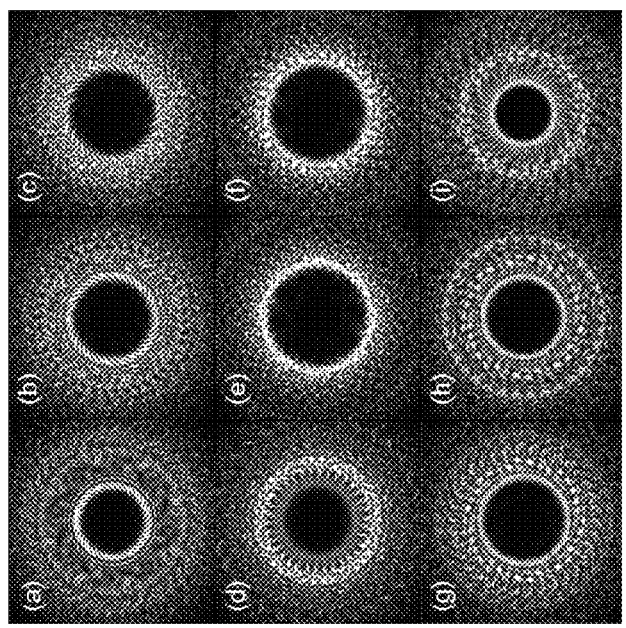
FIG. 14 (parts (a) through (i)) is a set of images of frequency-space responses of the patterns of FIG. 13.

Varying only the divergence angle can have a dramatic influence on the spiral spectral (spatial frequency) and local correlation properties. FIG. 14 shows calculated spatial Fourier spectrum of the spiral structures show in FIG. 13, specifically the reciprocal space structure of (a) $\alpha_1$ spiral, (b) $\alpha_2$ spiral, (c) $\alpha_3$ spiral, (d) $\alpha_4$ spiral, (e) GA spiral, (f) $\beta_1$ spiral (g) $\beta_2$ spiral, (h) $\beta_3$ spiral, and (i) $\beta_4$ spiral. It can be seen that changing the divergence angle controls the distribution of spatial frequencies, and that it is possible to realize one-parameter engineering of the amorphous Fourier space.

Figure 15:
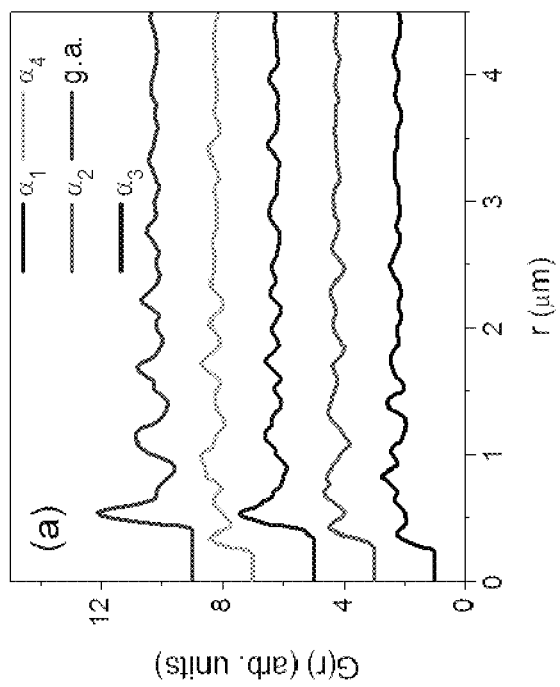
FIG. 15 is a plot of pair correlation functions.

FIG. 15 shows pair correlation functions G(r) for selected spirals of FIG. 13, illustrating that these functions are tunable in a range between amorphous and random structures.

Figure 16:
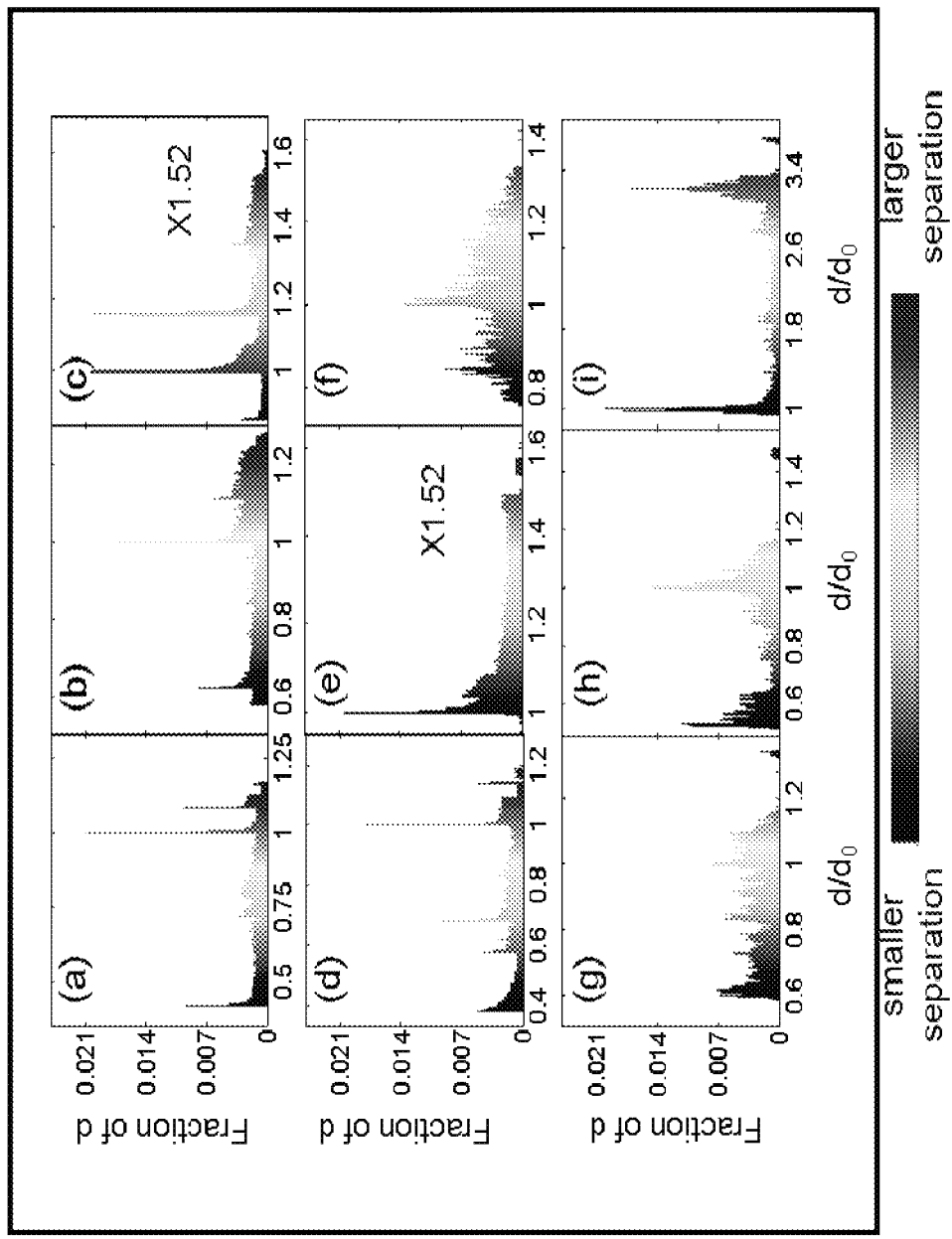
FIG. 16 is a plot of distributions of nearest neighbor distances.

FIG. 16 provides results of Delaunay triangulation for each of the spirals of FIG. 13. The graphs display the spatial distribution of nearest-neighbor distance in each array. The distance parameter d is normalized by a value $d_0$ which is the most probable value. It can be seen that the distributions are distinctively non-Gaussian in nature.

Figure 17:
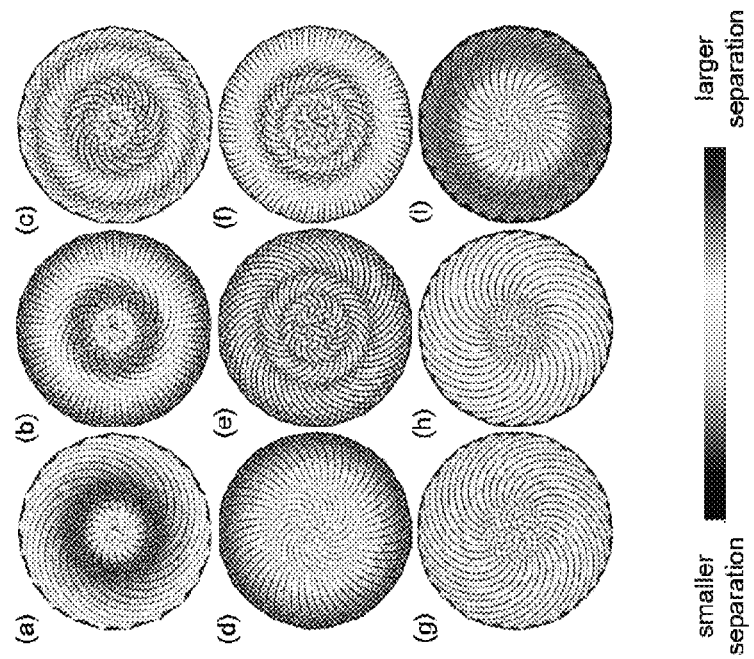
FIG. 17 is an image illustrating results of Delaunay triangulation.

FIG. 17 show color patterns featuring well-defined circular regions of markedly different values of d for the various arrays of FIG. 13. The regions can be referred to as "radial heterostructures"—circular regions of different lattice constants which act as radial Bragg gratings, resulting in the trapping of radiation at specific radial distances.

Figure 20:
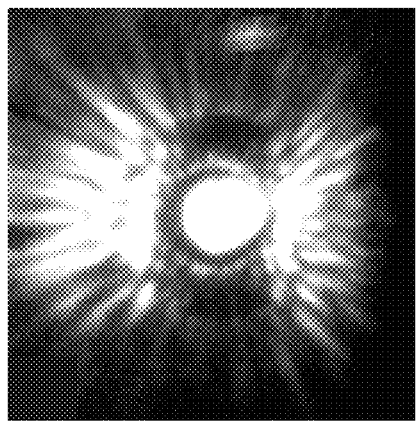
FIG. 20 is an image of a frequency-space response of the substrate of FIG. 18.
Figure 18:
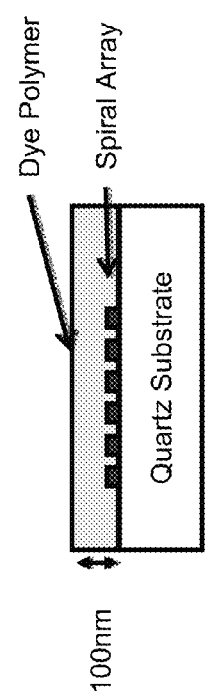
FIG. 18 is a schematic diagram of a patterned substrate with a laser dye polymer.
Figure 19:
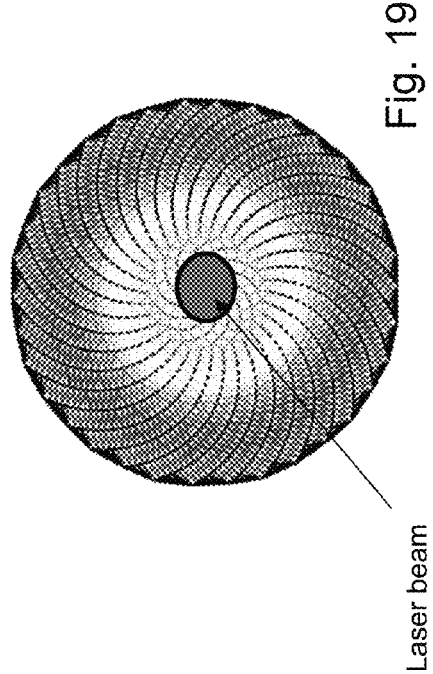
FIG. 19 is a diagram of the substrate of FIG. 18 with incident laser light.

FIGS. 18-20 illustrate polarization-insensitive, planar diffraction of incident radiation at multiple frequencies due to enhanced light-matter coupling phenomena in thin-film structures. These describe an experiment of imaging the fluorescence of a thin dye polymer layer coated on top of the aperiodic spirals.

FIG. 18 shows the structuring of the optical device. A dye polymer solution can be prepared by dissolving common laser dye molecules (e.g. a crystal powder known as DCM sold by Exciton Inc.) in toluene. The dilute solution can be mixed with PMMA, spun onto samples (such as described above with reference to FIG. 10) and cured, resulting in devices having 100 nm thick films of laser dye doped PMMA. DCM in particular has maximum absorption at 480 nm and an emission peak at 640 nm, which is well-overlapping with the scattering resonances of the $\alpha_2$ spirals.

As shown in FIG. 19, the sample can be illuminated or "pumped" by positioning an illuminating laser beam at a location on the doped PMMA substrate at normal incidence (focused through a 10× objective). A 30-mW laser diode source at 480 nm may be used. Light can be collected in transmission configuration through the quartz substrate using a lens of 100 mm focal length, then imaged by a CCD camera. To capture only the emission patterns, the pump laser light may be blocked by a 514 nm high-pass filter. In FIG. 19, the laser beam is incident at the center of the spiral pattern.

FIG. 20 shows CCD image of the fluorescence collected in transmission through the reference sample when pumped at the center location as shown in FIG. 19. FIG. 20 shows the spreading of the fluorescence signal in the plane of the spiral array, where a significant fraction of the emitted intensity is coupled into quartz substrate modes when the sample is symmetrically pumped through its center. Other spatial distributions of the radiation can be obtained by pumping at different (non-center) locations. For example, if the position of the laser pumping spot is slightly misplaced (approximately 25 µm) from the center of the sample, the spatial distribution of the radiation may change dramatically. Such an effect is due to the excitation of different spatial frequencies encoded on the surface of the sample, corresponding to vastly different angular spectra. The effect shown in FIG. 20 is a direct consequence of the distribution of local spatial frequencies which are associated to the surfaces of aperiodic spirals with circularly-symmetric Fourier space.

The scattering resonances of aperiodic spirals strikingly manifest their characteristic circular symmetry when imaged in dark-field mode under white-light illumination. Dark-field images may exhibit highly inhomogeneous spatial distributions of different chromatic components that heavily depend on the spiral geometry as well as the minimum inter-particle separation. When the inter-particle separation is decreased, diffractive coupling effects become significant and produce more pronounced structural resonances. $\alpha_1$ and $\alpha_2$ spirals may exhibit scattered patterns with a remarkable degree of circular symmetry at specific wavelengths matching the local spatial frequencies of the structures. The inhomogeneous spatial arrangement of nanoparticles in the $\alpha_1$ and $\alpha_2$ spirals is reflected in the presence of multiple circular bands stemming from the local spatial frequencies on the arrays, which diffract the resonant wavelengths. When illuminated by white light, each scattering ring efficiently diffracts light of different wavelengths in the array plane. This effect may be less pronounced in the g spirals due to their higher degree of structural uniformity manifested by the presence of only one broad scattering ring in Fourier space.

Additional features by can appreciated by utilizing bandpass filters to collect dark-field scattering images at specific wavelengths. Chromatic components may share similar spatial patterns resulting, when superimposed, in and outer circular corona. On the other hand, more homogeneous intensity distributions of scattered components may give rise to an inner circular corona. demonstrating that the multiple spatial frequencies encoded on the structure's surface give rise to spatially inhomogeneous scattering resonances.

Angular Momentum of Light in Aperiodic Spirals

As mentioned above, dark-field images of aperiodic spirals suggest the formation of a vortex-like intensity distribution spiraling towards the center of the images. Also, such "optically turbulent" regions are affected by the inter-particle separations, indicating that radiative coupling among the particles in the arrays plays a crucial role in the formation of such colorimetric patterns. A known technique referred to as General Mie Theory (GMT) analysis can be performed to demonstrate that circularly-symmetric scattering resonances in aperiodic spirals can indeed carry orbital angular momentum giving rise to polarization vortices. In particular, calculations can be made of the spatial distributions of the scattered electric field intensity corresponding to different vertical positions measured from the array plane, as well as the azimuthal components of the electromagnetic linear momentum, which directly conveys information of the angular momentum.

Figure 21:
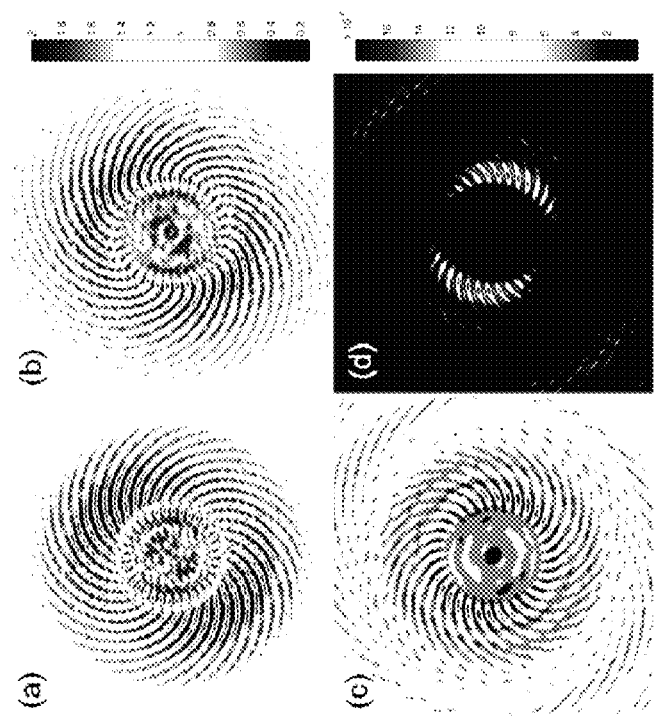
FIG. 21 (parts (a) through (d)) are images of a vortex-like frequency-space response.

FIG. 21 shows plots of GMT simulations for an $\alpha_2$ spiral consisting of 1500 Au spheres of diameter 200 nm, excited at normal incidence with a plane wave $\lambda$=650 nm. The plots of (a)-(c) are of the scattered intensity profiles calculated at 1 µm, 3 µm, and 10 µm from the plane of the array. The plot of (d) shows the magnitude of the phi-component of the linear momentum at 10 µm from the center of the spheres.

It is evident from FIG. 21 (a)-(c) that the scattered intensity patterns rotate clockwise as they propagate away from the array plane. The interaction of the incident plane wave with the spiral structures transfers net orbital momentum to the scattered radiation. This effect is demonstrated in FIG. 21 (d) showing the azimuthal component $p_\phi$ of the linear electromagnetic momentum density. The linear momentum density is obtained by calculating the ratio of the time-averaged Poynting vector S with the square of the free-space velocity of light. It is known that the $p_\phi$ component of the linear momentum density is directly related to the angular momentum density of a free beam that propagate along the vertical z axis (the spiral arrays lie in the horizontal x-y pane) by the linear relation:

$$J_z = r p_\phi \quad (4)$$

where r is the position vector. The results shown in FIG. 21(d) provide a rigorous justification to the angular momentum transfer mechanism associated to the excitation of the circularly-symmetric scattering resonances in nanoplasmonic spirals. The engineering of optical vortices in miniature-size integrated circuits is another exciting feature of aperiodic nanospirals that can result in compact polarization devices for on-chip nanoplasmonics and optical trapping applications.

To further describe the optical modes created in spiral aperiodic arrays, Fourier-Bessel analysis may be performed on the electric field distributions of the calculated modes to find radial and azimuthal contributions. The Fourier-Bessel transform, $f(m,k_r)$, is given by, $$f(m, k_r) = \frac{1}{2\pi} \int_0^\infty \int_0^{2\pi} r\, dr\, d\theta \rho(r, \theta) J_m(k_r r) e^{im\theta} \quad (5)$$

where:
 $\rho(r,\theta)$=density function
 m=azimuthal number
 kr=spatial frequency in the radial direction and $J_m$ is the Bessel function of order m. The Bessel transform decomposes the mode into a basis set of Bessel functions, and $f(m,k_r)$ gives the contribution of a Bessel function with order m and radial wavevector $k_r$. The linear momentum density, p, of each of the calculated modes is given by:

$$p = \epsilon_0 \langle E \times B \rangle. \qquad (6)$$

Figure 22:
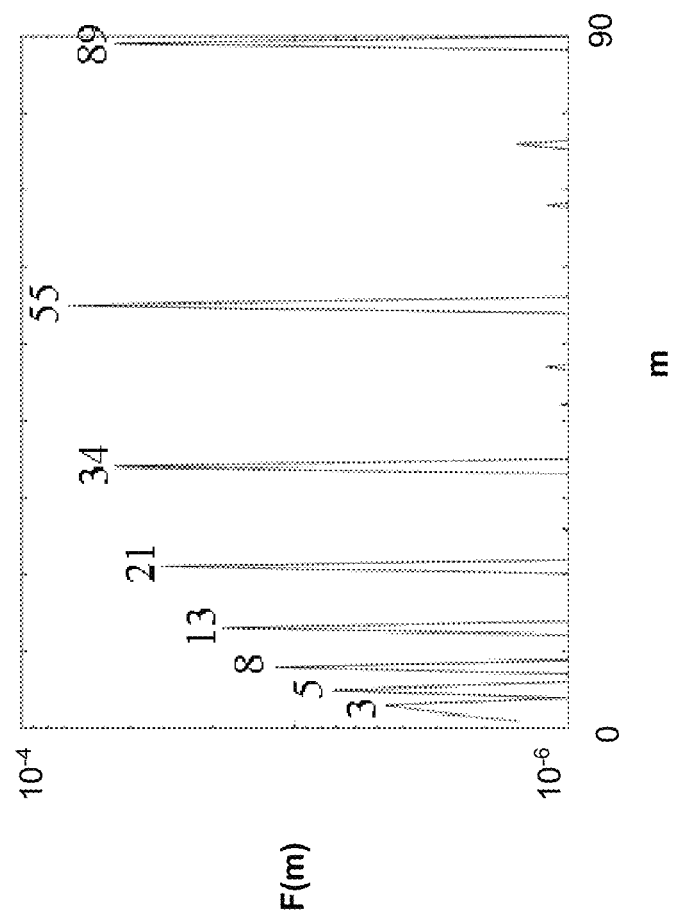
FIG. 22 is a plot of a Fourier-Bessel decomposition of optical modes in a vortex-like frequency-space response.
Figure 23:
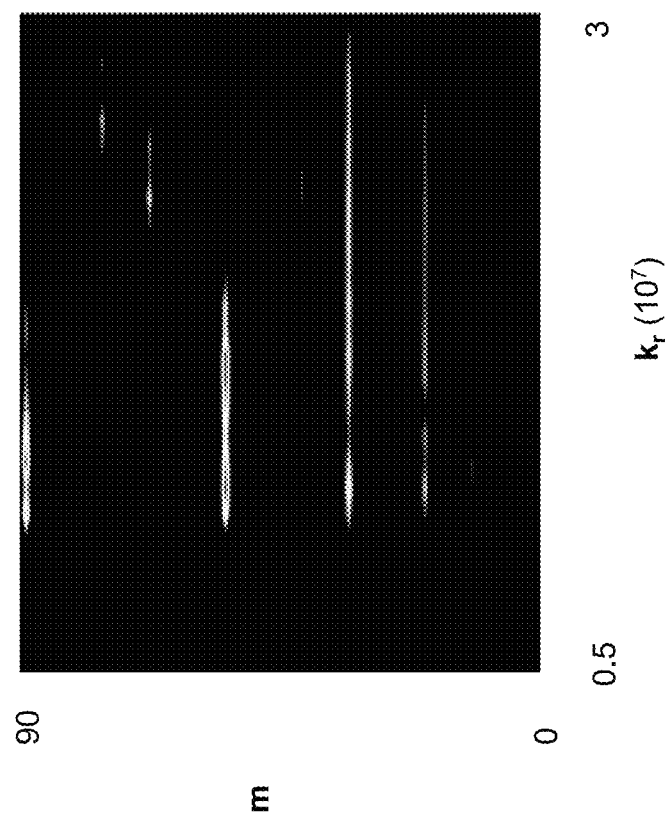
FIG. 23 is a plot of azimuthal components of optical modes in a vortex-like frequency-space response.

FIGS. 22 and 23 show results of Fourier-Bessel analysis of a family of spiral arrays. FIG. 22 shows a plot of F(m) as a function of Bessel order m, having peaks at certain values. FIG. 23 shows wave density as a function of m, and it can be seen that the distribution has a discrete nature with values grouped at the same values of m as in the plot of FIG. 22. The dominant m values in this example are 5, 8, 13, 21, 34, 55, and 89, which are Fibonacci numbers and represent the number of parastichies in each family. The parastichies encode discrete angular momenta, quantized in the Fibonacci numbers, onto the optical resonances.

Figure 24:
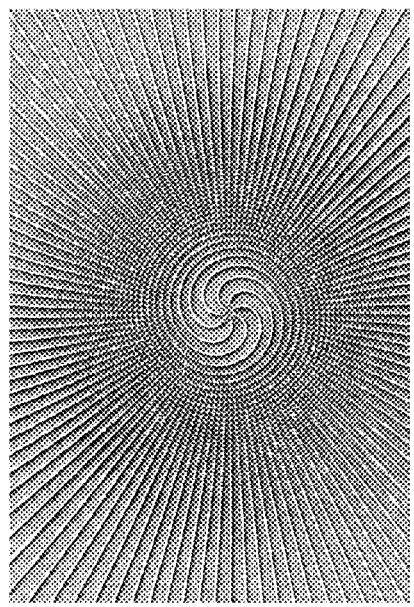
FIG. 24 is an image of a π spiral.
Figure 26:
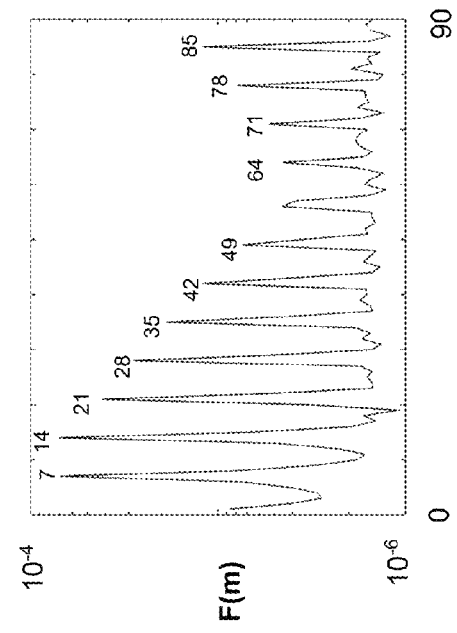
FIG. 26 is a plot of a Fourier-Bessel decomposition of optical modes for the π spiral of FIG. 24.
Figure 25:
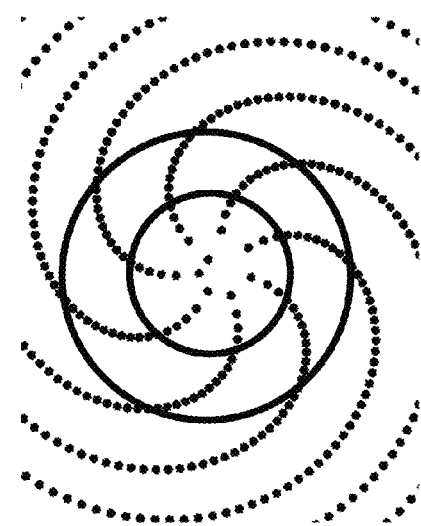
FIG. 25 is a schematic close-up of a section of the π spiral of FIG. 24.

FIG. 24 shows an example of a spiral referred to as a "π spiral" for which the constant divergence angle is 50.97°. FIG. 25 shows zones (circled areas) of Fourier-Bessel decomposition, and FIG. 26 illustrates the results of the Fourier-Bessel decomposition with the noteworthy feature of azimuthal symmetries at multiples of 7.

Figure 27:
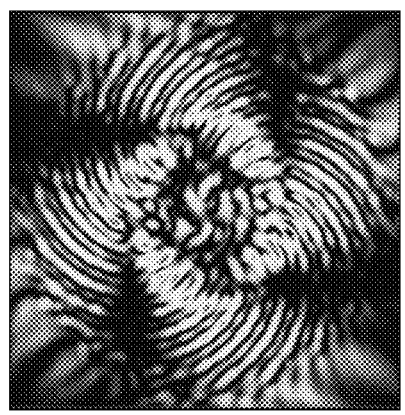
FIGS. 27 and 28 (parts (a)-(b)) are images of a vortex-like frequency-space response.
Figure 28:
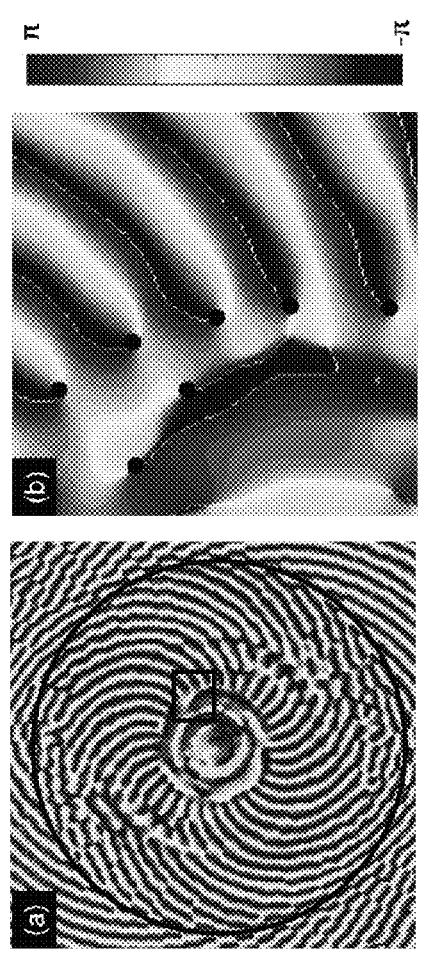

FIGS. 27-28 are phase plots depicting the existence of phase discontinuities or "singularities", which are points where the real and imaginary part of the wave function vanishes. At these points the amplitude is zero and the phase is indeterminate. In FIG. 28 (b) singularities exist at points shown by the black dots, and as shown there is a complete 2π phase shift about each point.

Figure 29:
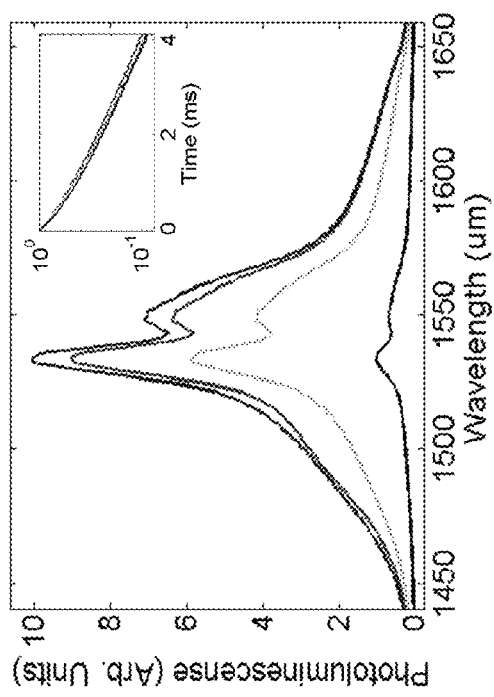
FIGS. 29-30 are plots of characteristics related to extraction enhancement.
Figure 30:
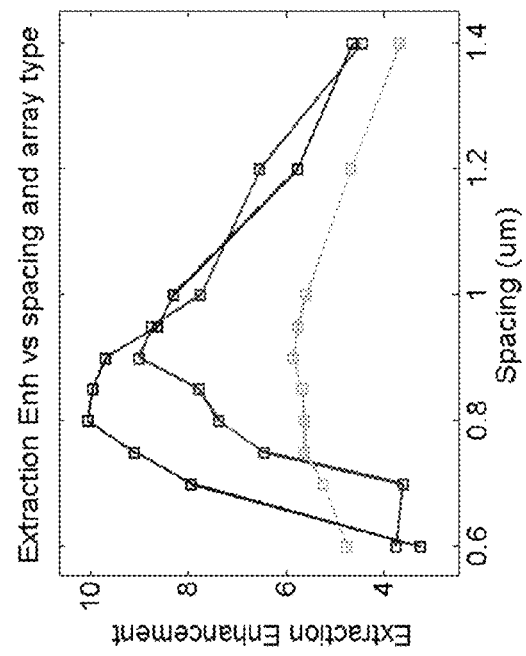

FIGS. 29-30 provide information regarding the enhancement of light extraction efficiency using spiral patterning as described herein. Optical devices can be characterized using a process in which their emission spectra is measured, emitted light is imaged, and measuring the device radiation profile by imaging the Fourier plane of the collected emission. An example device is a single mode active planar waveguides (Er-doped silicon nitride). Representative emission spectra (photoluminescence) are plotted in FIG. 29 for a GA spiral (highest curve), Archimedean (next lower), Pinwheel (next lower) and a reference unpatterned area of the sample (lowest curve). The nanopillar arrays exhibit a large increase in the photoluminescence signal due to enhanced extraction. The emission spectra of all the devices show a typical asymmetric Erbium line shape peaked at 1.535 μm that is unaltered by the array geometry. The emission lifetime of Er (inset of FIG. 29) shows little to no change for all devices. The unaltered lifetimes indicate that there is not a change in the material radiation properties from alterations of the local density of states (LDOS).

FIG. 30 is a plot of extraction enhancement as a function of lattice spacing (average first neighbor spacing, with constant pillar radius/lattice spacing ratio of 0.4) for three array types—Spiral (highest curve), Pinwheel lattice (next lower) and Archimedean lattice (lowest), which are good examples of arrays with high degree of rotational symmetry (needed to efficiently extract from all directions in the plane). The GA spiral and Archimedean lattice show an optimization of the extraction with a relatively sharp decrease for smaller lattice spacing due to the matching of their well-defined Fourier space ring with the wavevector of the emitted light, while the Pinwheel shows a lower value of peak extraction and less variation with lattice spacing due to the diffuse character of its Fourier transform. The diagrams show that 10× extraction enhancement can be achieved at the Er emission using aperiodic golden angle spirals in purely dielectric structures.

The engineering of aperiodic lattices can not only increase light extraction but also offers opportunities to control directional emission profiles. Generally, as the lattice spacing increases the emission becomes more strongly localized to the center of the k-space image indicating more light extraction normal to the chip. As the lattice spacing increases further the light becomes again spread to a larger spot. 6-fold symmetry in the azimuthal direction may be observed in the k-space emission from the Archimedean lattice, a feature that originates from the 6-fold symmetry of the lattice and its Fourier transform. The spiral lattices on the other hand show an azimuthally isotropic k-space due to the continuous circular symmetry of their Fourier transform. The Pinwheel lattices have a significantly more diffuse extraction for all lattice spacings and a pattern that shows some azimuthal anisotropy, although not as strongly as the Archimedean lattice.

Figure 31:
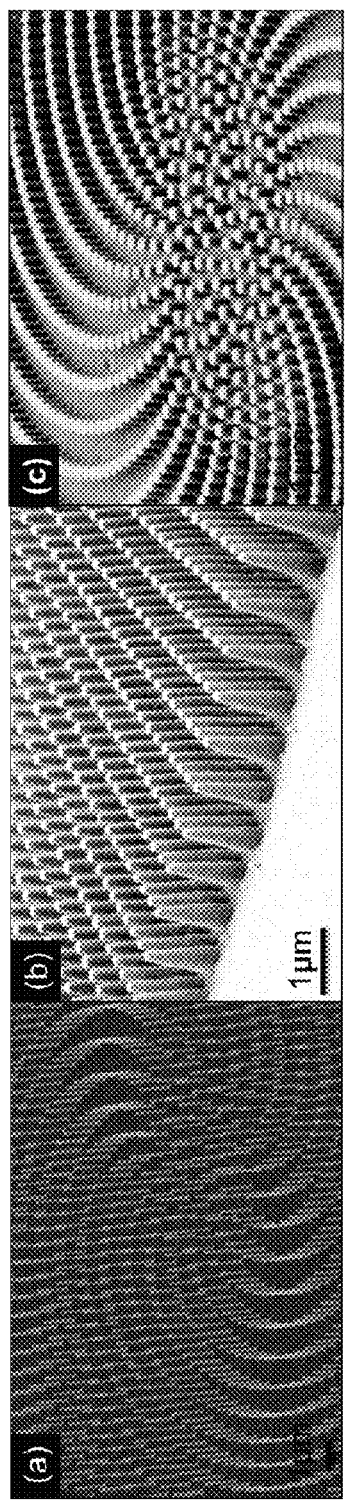
FIG. 31 (parts (a) through (c)) are images of spiral arrays.

FIG. 31 provides images of other arrays, with (a) and (b) having conical-shaped nanopillars while (c) has cylindrical nanopillars.

As described above, the spiral patterns are based on a polar-coordinate generating function based on an irrational-valued constant divergence angle. The following table presents names and approximate divergence angle values for other types of spirals. It is noted that these include divergence angles based on the transcendental numbers π, e and i:

| Golden | Inverse Golden | $\sqrt{2}$ | $i^i$ | e | $e^2/\pi$ | Bronze Mean | π | Ni Mean |
|---|---|---|---|---|---|---|---|---|
| 137.51 | 222.49 | 149.1 | 74.8 | 258.58 | 126.72 | 109 | 50.97 | 132 |

Figure 32:
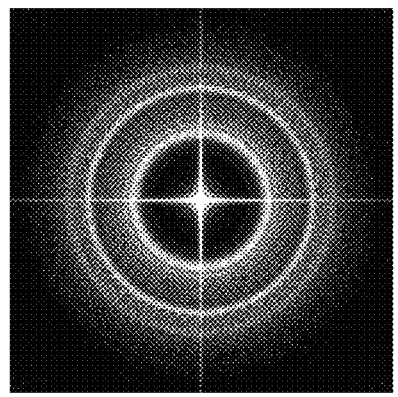
FIGS. 32 and 33 are images of spiral patterns.
Figure 33:
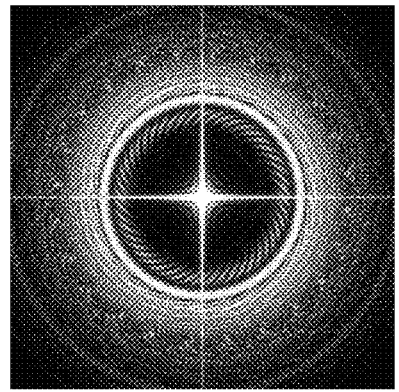
Figure 34:
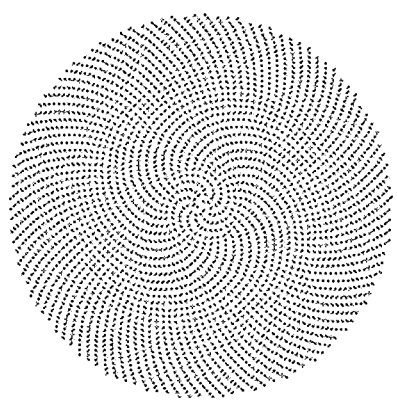
FIGS. 34 and 35 are images of frequency-space responses of the patterns of FIGS. 32 and 33.
Figure 35:
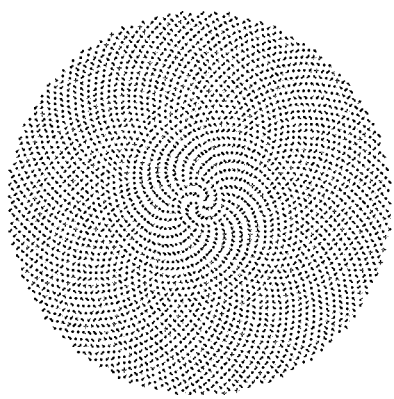

FIGS. 32 and 33 show examples of "Nickel mean" and $i^i$ spirals respectively, while FIGS. 34 and 35 show their respective reciprocal-space characteristics.

Referring to FIG. 36, an optical device as disclosed herein may include semiconductor structure (SC structure, such as a photodiode) configured to detect radiative electromagnetic energy as incident on the optical device and generate a corresponding electrical output. The spiral-geometry deterministic aperiodic patterning can provide enhanced absorption of the radiative electromagnetic energy by the semiconductor structure, over a comparable optical device lacking the deterministic aperiodic patterning.

Referring to FIG. 37, an optical device as disclosed herein may include semiconductor structure (SC structure, such as a light emitting diode) configured to generate electromagnetic energy in response to an electrical input. The spiral-geometry deterministic aperiodic patterning can provide enhanced extraction of the electromagnetic energy from the semiconductor structure, over a comparable optical device lacking such deterministic aperiodic patterning.

Figure 38:
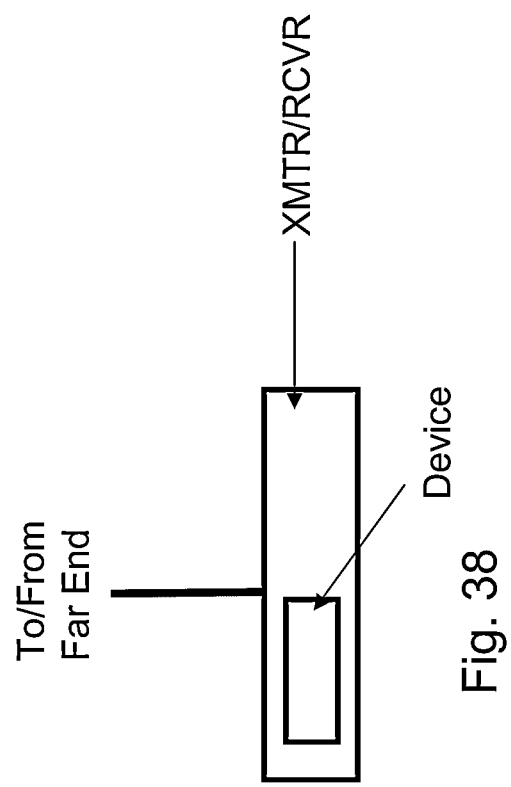
FIG. 38 is a schematic diagram of a portion of an optical communications system.

FIG. 38 illustrates use of an optical device configured for detecting or generating a pattern of the optical angular momentum as carrying corresponding signaling information in an optical communications system. Specifically, the optical device may be part of an optical transmitter or receiver in such a system. The system may employ an array of photonic-fiber waveguides by which the signaling information of the optical angular momentum is conveyed.

An optical device such as disclosed herein may be used as part of an optical tweezers device for controlling movement of a microscopic object based on the optical angular momentum. In this application, the vortex-like orbital angular momentum of generated optical energy can interact with suitably small objects to physically control their movement.

While various embodiments of the invention have been particularly shown and described, it will be understood by those skilled in the art that various changes in form and details may be made therein without departing from the spirit and scope of the invention as defined by the appended claims.

What is claimed is:

1. An optical device operative in response to radiative electromagnetic energy to create a distribution of electromagnetic energy having localized electromagnetic field enhancement, the optical device comprising a dielectric or plasmonic material having a region of interaction with the radiative electromagnetic energy, the region of interaction having a deterministic, aperiodic patterning with an array of individual patterning elements of distinct refractive indices such that a variation of refractive index of the optical device occurs over distances comparable with or smaller than a wavelength of the incident electromagnetic energy, the array having a spiral geometry imparting a substantially continuous and rotationally symmetric characteristic to the distribution of electromagnetic energy created in response to the radiative electromagnetic energy.

2. An optical device according to claim 1 including semiconductor structure configured to generate electromagnetic energy as the radiative electromagnetic energy, and wherein the deterministic aperiodic patterning provides for enhanced extraction of the radiative electromagnetic energy from the semiconductor structure over a comparable optical device lacking the deterministic aperiodic patterning.

3. An optical device according to claim 2, wherein the semiconductor structure is a light emitting diode.

4. An optical device according to claim 1 including semiconductor structure configured to detect the radiative electromagnetic energy as incident on the optical device at the region of interaction, and wherein the deterministic aperiodic patterning provides for enhanced absorption of the radiative electromagnetic energy by the semiconductor structure over a comparable optical device lacking the deterministic aperiodic patterning.

5. An optical device according to claim 4, wherein the semiconductor structure is a photoconductive diode.

6. An optical device according to claim 1, wherein the spiral geometry is described by a polar-coordinate generating function based on an irrational-valued divergence angle.

7. An optical device according to claim 6, wherein the spiral geometry has a tunable response and the divergence angle is a single parameter for tuning the tunable response, and wherein the divergence angle is based on one or more transcendental numbers.

8. An optical device according to claim 1, wherein the array is configured to induce localized optical modes in the region of interaction.

9. An optical device according to claim 8, configured to encode well-defined values of orbital angular momentum (OAM) onto radiation scattered or emitted from the optical device.

10. An optical device according to claim 9, configured to encode and generate well-defined values of OAM to a large density of localized optical modes over a tunable frequency range.

11. An optical device according to claim 9, configured to generate OAM states with arbitrary integer values of angular momentum determined by the aperiodic spiral geometry.

12. An optical device according to claim 9, configured to transmit complex OAM states carrying different values of OAM simultaneously on a planar optical chip.

13. An optical device according to claim 8, wherein the localized optical modes exhibit vortex-like optical angular momentum about a center point of the array.

14. An optical device according to claim 13, configurable for detecting or generating a pattern of the optical angular momentum as carrying corresponding signaling information.

15. An optical device according to claim 14, configurable as part of a transmitter or receiver in an optical communications system conveying the signaling information of the optical angular momentum from one location to another.

16. An optical device according to claim 15, wherein the optical communications system includes an array of photonic-fiber waveguides by which the signaling information of the optical angular momentum is conveyed.

17. An optical device according to claim 13, configurable for use in an optical tweezers device for controlling movement of a microscopic object based on the optical angular momentum.

18. An optical device according to claim 1, wherein the patterning elements are dielectric elements photonically interacting with the radiative electromagnetic energy.

19. An optical device according to claim 1, wherein the patterning elements are metal elements plasmonically interacting with the radiative electromagnetic energy.

20. A method of manufacturing an optical device, comprising:
identifying a region of interaction of the optical device with radiative electromagnetic energy, the region of interaction to contain a distribution of electromagnetic energy in response to the radiative electromagnetic energy, the distribution of electromagnetic energy having localized electromagnetic field enhancement; and
forming a deterministic, aperiodic patterning of a dielectric or plasmonic material in the region of interaction, the aperiodic patterning including an array of individual patterning elements of distinct refractive indices such that a variation of refractive index of the optical device occurs over distances comparable with or smaller than a wavelength of the incident electromagnetic energy, the array having a spiral geometry imparting a substantially continuous and rotationally symmetric characteristic to the distribution of electromagnetic energy created in response to the radiative electromagnetic energy.

* * * * *